US006357928B1

United States Patent
Haley et al.

(10) Patent No.: US 6,357,928 B1
(45) Date of Patent: Mar. 19, 2002

(54) FIBER OPTIC CONNECTOR HAVING A PLURALITY OF ARRAY INTERFACES

(75) Inventors: Edmund Joseph Haley, Dillsburg; Robert Ney Weber, Hummelstown, both of PA (US)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 09/440,909

(22) Filed: Nov. 16, 1999

(51) Int. Cl.[7] .................................................. G02B 6/38
(52) U.S. Cl. ........................................ 385/59; 385/60
(58) Field of Search ............................ 385/59, 60, 56, 385/78, 76, 72, 75

(56) References Cited

U.S. PATENT DOCUMENTS

| 4,312,564 A | 1/1982 | Cafarelli et al. ......... 350/96.22 |
| 5,620,634 A | 4/1997 | Shahid ....................... 264/1.25 |
| 5,845,026 A | 12/1998 | Lee et al. ...................... 385/58 |
| 5,870,515 A * | 2/1999 | Ott et al. ....................... 385/59 |

FOREIGN PATENT DOCUMENTS

| EP | 0512722 A1 | 8/1992 | ............ G02B/6/38 |
| EP | 0947865 A1 | 3/1999 | ............ G02B/6/34 |

OTHER PUBLICATIONS

International Search Report, International Application No. PCT/US/31496 16/07/2001.

* cited by examiner

Primary Examiner—Phan T. H. Palmer

(57) ABSTRACT

The invention provides an optical connector for coupling a plurality of optical fibers in an array configuration. The optical connector housing is designed to accommodate a plurality of array ferrules. Each array ferrule holds multiple fiber ends each being precisely positioned with respect to alignment features of the ferrule. The plurality of ferrules may be either independently biased or dependently biased.

13 Claims, 5 Drawing Sheets

FIBER OPTIC CONNECTOR HAVING A PLURALITY OF ARRAY INTERFACES

BACKGROUND

This invention is related to optical connectors and more particularly to an optical connector having a plurality of optical array interfaces.

Over the past two decades the requirements for data transmission have doubled approximately every two years. The Internet and other computer networks have contributed to the increasing use of fiber optic networks to meet the increasing demands for data transmission. Optical connector systems have been developed to interconnect optical transmission lines in these networks. One such example of an optical connector is shown in U.S. Pat. No. 5,764,834 to Hultermans. The patent teaches an optical fiber connector having a jack mounted to a motherboard and a plug mounted to a daughterboard. A slidable insert is retained by thrust lances against the shoulder of the plug housing such that the insert can be inserted into a cavity of the jack. Latches of the jack serve to latch onto ribs of the plug insert so as to but a ferrule of the plug against a ferrule of the jack. Insertion of the jack into the plug causes ribs to release the thrust lances of the plug insert such that the insert springs rearward allowing the plug housing to slide forward without spring resistance. A problem exists in that each plug insert contains a ferrule for holding a singular fiber. In order to achieve high-density optical interconnections, multiple fiber ferrules are required.

PCT publication WO 98/00741 shows an optical connector system wherein each connector has a ferrule for receiving a plurality of fibers. The ferrule is surrounded by an inner housing and the inner housing is surrounded by an outer housing which is slidable over the inner housing. This arrangement presents an improvement in that a plurality of fibers may be mounted within each ferrule. However, optical interconnection density is limited by the alignment capabilities of a single ferrule and therefore multiple connectors are necessary to achieve high density optical interconnections. It is desirable to increase the optical interconnection density and therefore it is desirable to provide an optical connector having a greater number of interconnections than the present multi fiber ferrule design.

SUMMARY

It is an object of the present invention to provide an optical interface having precision alignment within a large number of optical interfaces while minimizing the number of components necessary to achieve the interconnection.

This and other objects have been achieved by providing an optical interconnection system having a pair of complementary connectors each featuring a plurality of array ferrules that receive a plurality of optical fibers.

DETAILED DESCRIPTION OF THE PREFERRED EMBODIMENT

Figure 1:
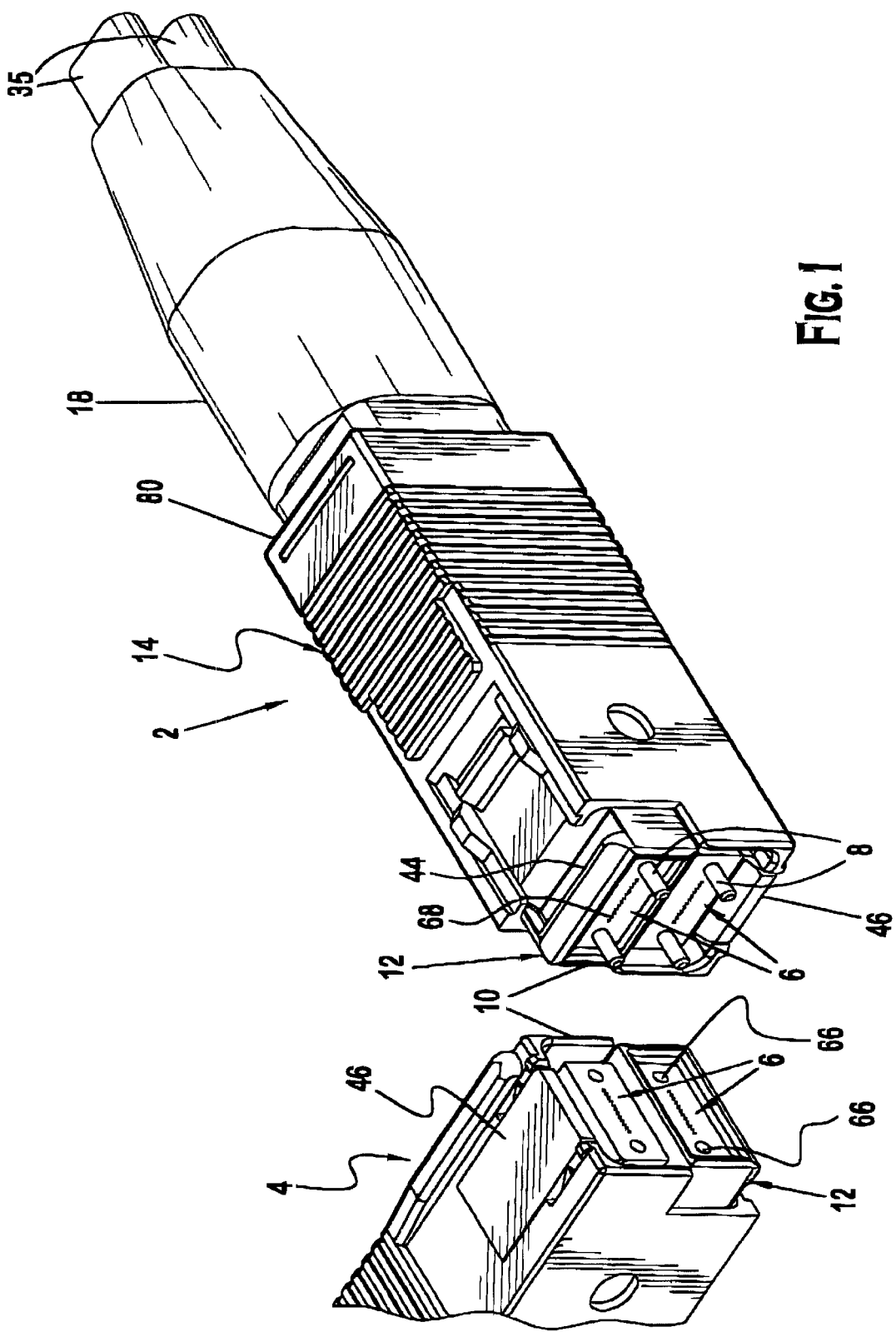
FIG. 1 shows a preferred embodiment of the connector of the present invention along with a mating connector.

The invention will first be described generally with reference to FIG. 1. This figure shows an optical connector 2 having an inner housing 12 mounted within an outer housing 14. The outer housing 14 is slidable over the inner housing 12. A plurality of ferrules 6 are mounted within the inner housing and at least one cable 35 extends from a rear end 80.

Figure 2:
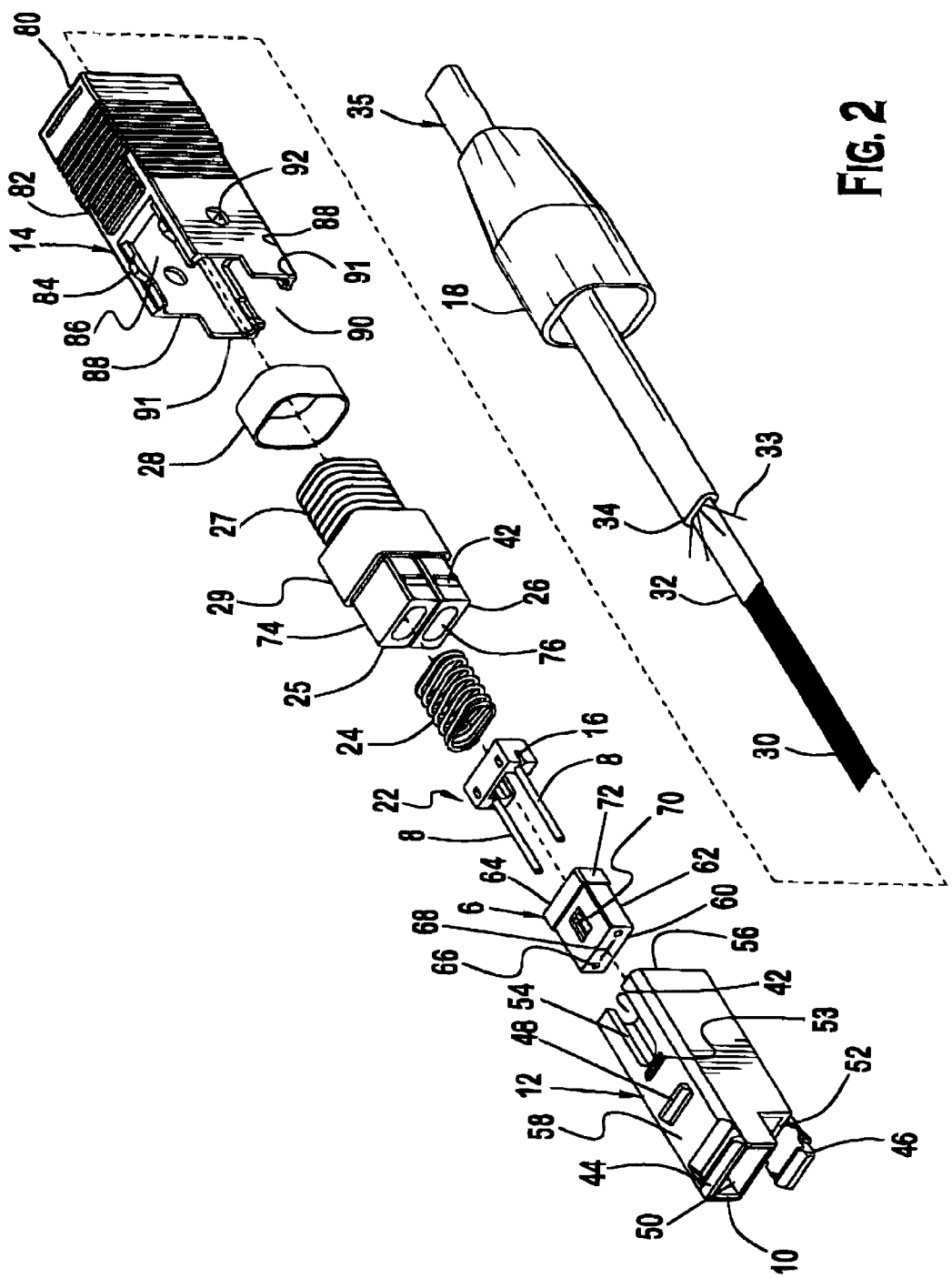
FIG. 2 shows an exploded view of the connector of FIG. 1.

Turning now to FIG. 2 each of the major components will be described in greater detail. Starting at the mating end 10, the inner housing 12 will now be described in greater detail. The inner housing 12 features a hollow portion 42 extending from a rear end 56 to the mating end 10. A first ferrule receiving section 50 is disposed between the mating end 10 and hollow portion 42. Similarly, a second ferrule receiving section 52 is disposed between the mating end 10 and the hollow portion 42. A latch 46 extends outward toward the mating end 10 adjacent to the second ferrule receiving section 52. A first shoulder 44 is disposed adjacent the mating end 10 along a top surface 58 of the inner housing 12. A second shoulder 48 is disposed behind the first shoulder 44 also along the top surface 58. A projection 53 extends from the top surface 58 behind the second shoulder 48. A semicircular opening 54 is formed in the top surface 58 and is in communication with the hollow portion 42 near the rear end 56.

The ferrule 6 is profiled to fit within either the first ferrule receiving section 50 or the second ferrule receiving section 52 and features the front portion 62 and a rear portion 72 having larger outer dimensions than the front portion 62. It should be understood that while a single ferrule 6 is shown here for simplicity, it is preferable to have two such ferrules 6 each positioned in a respective ferrule receiving section 50, 52. A plurality of pin receiving openings 66 extends from the mating face 60 rearward to the rear end 64. Likewise, a plurality of fiber receiving passageways 68 extends from the mating face 60 to the rear end 64. A window 70 extends from an outer surface into each of the fiber receiving passageways 68 at a location between the mating face 60 and the rear end 64.

A pin keeper 22 is disposed behind the ferrule 6 and is profiled to have a plurality of slots 16 for receiving pins 8. It should be understood that while a single pin keeper 22 is shown here for simplicity, it is preferable to have two such pin keepers 22 each positioned behind a respective ferrule 6. Pins 8 are positioned in the slots 16 of the pin keeper 22 such that they extend toward the mating end 10. It should be noted here that the pins 8 are optional and are used in one mating connector 2,4 or the other. A spring 24 or other suitable biasing device is provided behind the pin keeper 22. It should be understood that while a single ferrule 6, pin keeper 22 and spring 24 combination have been shown, the inner housing 12 is designed to receive more than one of each of these components.

A crimp plug 29 is disposed behind springs 24 and features a plurality of front portions 74 having cable-receiving passageways 76 extending therethrough. Optionally, the front portions 74 could be formed as a single portion having a plurality of cable-receiving passageways. The cable receiving passageways 76 extend from the front end 26 into a crimp section 27. The crimp section 27 is profiled to receive a crimp ring 28. A plurality of securing projections 78 extends from side surfaces of the front portions 74. The securing projections 78 could optionally be replaced by a single securing projection.

The outer housing 14 is a generally hollow component and is open from the rear end 80 to the mating end 10. A pair of side walls 88 contain side wall openings 92. The side walls 88 are profiled such that extended portions 91 project outward toward the mating end 10 in the vicinity of a latch receiving opening 90. A window 86 is provided along an opposite surface and is disposed between a pair of cams 84. A pair of ledges 82 are disposed along the same surface behind the cams 84.

An optical cable 35 is provided having a plurality of fibers 30 surrounded by an inner jacket 32 and strength members 33 which is surrounded by an outer jacket 34. A cable boot 18 is slidable over the outer jacket 34. It should be understood that while a single cable 35 is shown here for simplicity, it is preferable to utilize multiple cables or multiple groups of single fibers in this optical connector 2.

Assembly of the optical connector 2 will now be described in greater detail with reference to FIGS. 2 and 4. First, the cable boot 18, outer housing 14, crimp ring 28, crimp plug 29, and springs 24 are loaded onto pre-stripped cables 35. Fibers 30 are then terminated to each of the ferrules 6 using known techniques. For example, the fibers 30 are each inserted into respective fiber receiving passageways 68, a filler such as a curable epoxy is then flowed through the window 70 to secure fibers 30 within their respective fiber receiving passageways 68. It should be noted here that the user may optionally load only selected ones of the fiber receiving passageways 68 as required for the particular application. After the epoxy has been cured the fiber ends are then cleaved and polished utilizing known techniques. Pins 8 are assembled into pin keepers 22 by insertion into slots 16. It should be noted here that the pins 8 are optional and therefore this step may be skipped. The pin keepers 22 are then placed over a respective inner jacket 32 and pins 8 are inserted into pin receiving openings 66 from the rear end 56.

Assembled ferrules 6 and pin keepers 22 are then inserted into respective ferrule receiving sections 50, 52 from the rear end 56 of the inner housing 12. The springs 24 and crimp plug 29 are then inserted into the inner housing 12 from the rear end 56 until securing projections 78 lock into complementary features such as recesses or openings (not shown) on the inside of the inner housing 12. The outer jacket 34 is pulled over crimp section 27 and the crimp ring 28 is compressed over the outer jacket 34 and strength members 33 to secure it to the crimp section 27. It should be noted here that the outer jackets 34 have been stripped such that half of their diameters are removed in the vicinity of the crimp section 27. Therefore, the crimp ring 28 surrounds half of each outer jacket 34. Outer housing 14 is then assembled over the inner housing 12 and secured thereto by cooperation of projection 53 with the complementary recess inside the outer housing 14. The recess is preferably dimensioned to allow the inner housing 12 to slide back and forth within the outer housing 14. It should noted here as best shown in FIG. 4 that each ferrule 6 is independently biased forward by a spring 24.

Figure 3:
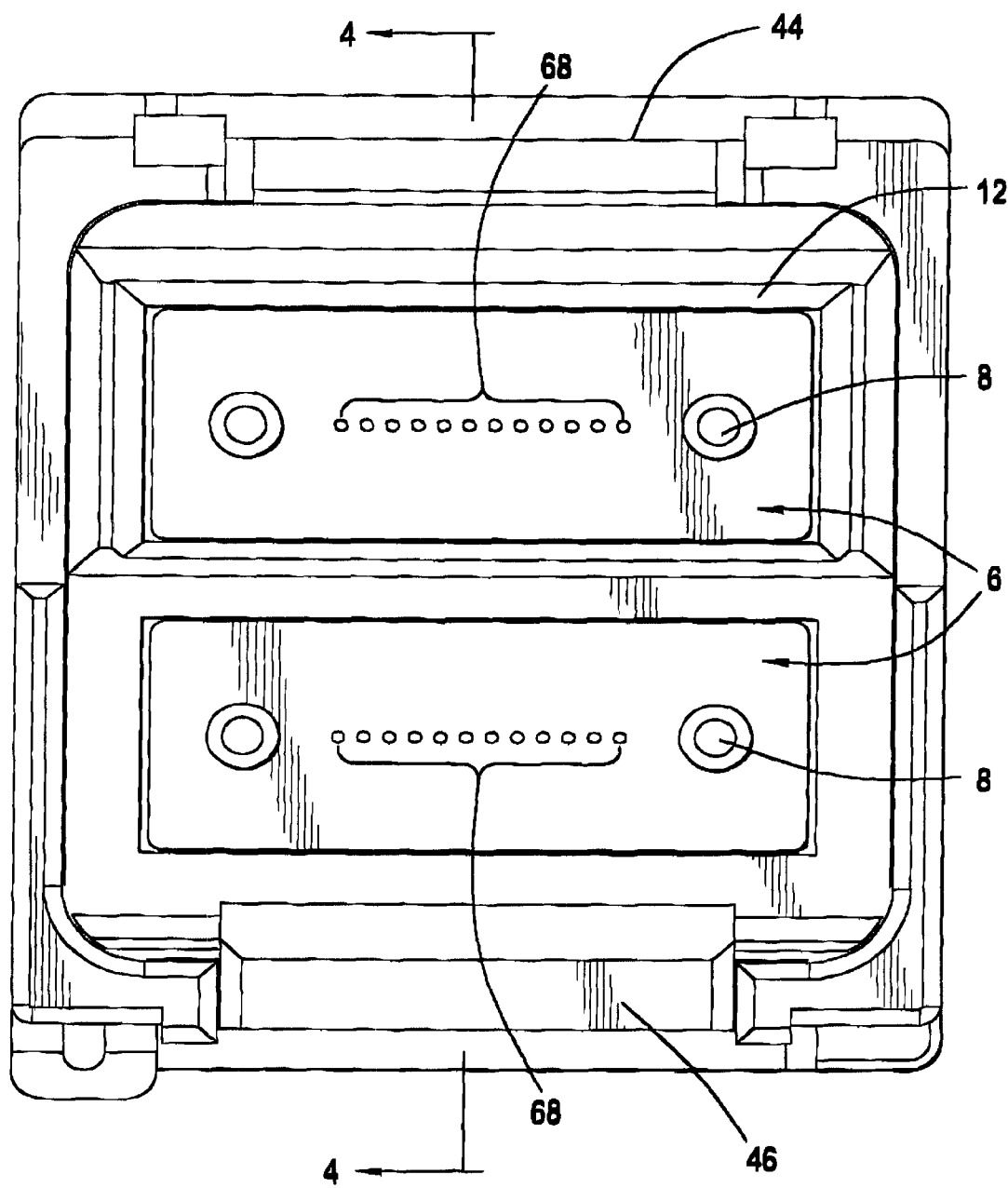
FIG. 3 shows a front view of the connector of FIG. 1.

An end view the assembled optical connector 2 is shown in FIG. 3. Two ferrules 6 are mounted inside the inner housing 12. The fiber receiving passageways 68 are precisely located between the pin receiving openings 66. Recall that alignment pins 8 may optionally project out of the pin receiving openings 66. Each fiber receiving passageways contains a fiber 30 having a polished end.

Figure 4:
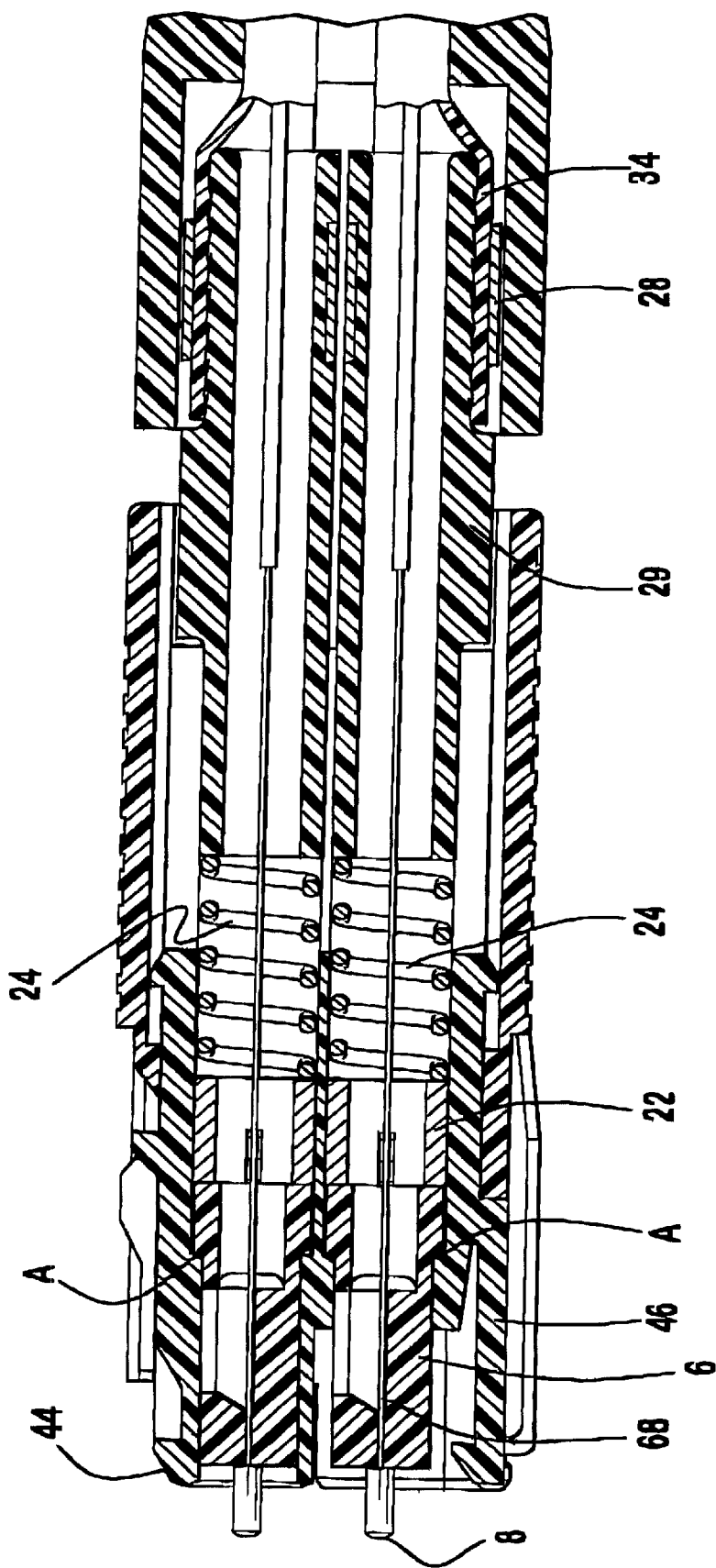
FIG. 4 is a cross-sectional view of the connector of FIG. 1.

Referring now to FIGS. 1 and 4, a mating sequence will be described in greater detail. In an unmated condition as shown in FIG. 4, both ferrules 6 are biased forward against a stop A in the inner housing 12 by the springs 24. As a pair of optical connectors 2, 4 are mated as shown in FIG. 1, alignment pins 8 of the optical connector 2 enter pin receiving openings 66 of the mating connector 4. The mating faces 6 then engage each other such that the fiber receiving passageway 68 are aligned between the optical connectors 2,4. As the connectors 2,4 are further urged toward each other, the ferrules 6 are pressed rearward against the springs 24. Respective latches 46 engage respective first shoulders 44 to secure the connectors 2 together.

Figure 5:
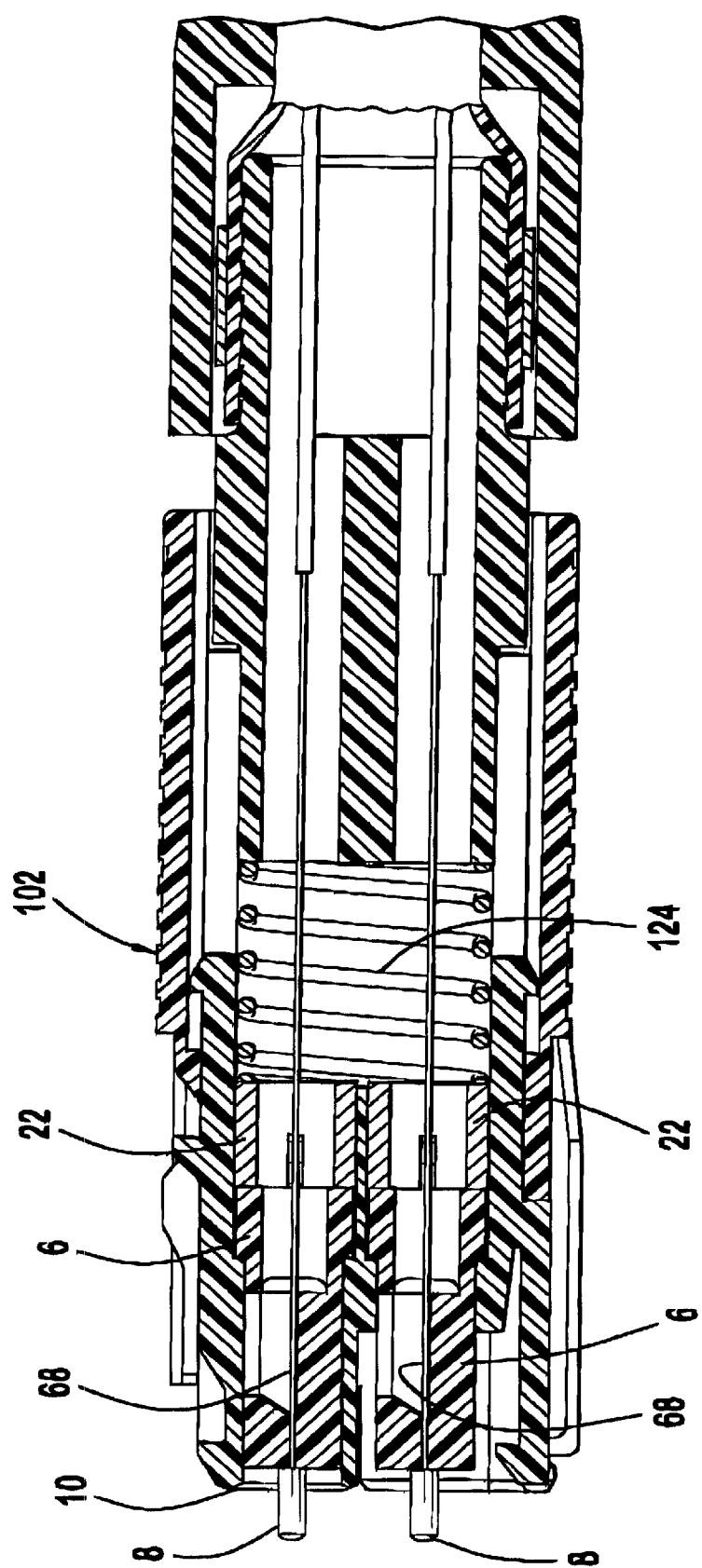
FIG. 5 is a cross-sectional view of an alternative embodiment of the connector of the present invention.

An alternate embodiment of an optical connector 102 is shown in FIG. 5. This optical connector 102 is similar to that of FIGS. 1–4 except that a single alternate spring 124 is utilized instead of two springs 24 for biasing both ferrules 6. The ferrules 6 are therefore dependently biased and move together.

An advantage of the present invention is that a plurality of ferrules 6 can be precisely aligned for an optical interface array within a singular optical connector housing.

What is claimed is:

1. An optical connector for interconnecting a plurality of optical fibers comprising:

a housing having a plurality of ferrule receiving sections;

a plurality of ferrules each disposed within a respective ferrule receiving section and each having a plurality of fiber receiving passageways and alignment openings being precisely positioned with respect to the fiber receiving passageways; and a single spring behind said plurality of ferrules for urging said plurality of ferrules.

2. The optical connector of claim 1 wherein the biasing means comprises a plurality of springs, each spring being associated with and urging a respective ferrule.

3. The optical connector of claim 2 further comprising a crimp plug disposed behind the biasing means and having a front surface in contact with the biasing means.

4. The optical connector of claim 3 further comprising a crimp ring disposed around the crimp plug for receiving a cable jacket therebetween.

5. The optical connector of claim 4 wherein the crimp ring further receives a strength member.

6. The optical connector of claim 1 further comprising a plurality of pin keepers, each pin keeper having openings for receiving alignment pins.

7. The optical connector of claim 1 further comprising biasing means disposed behind each ferrule.

8. The optical connector of claim 1 further comprising a crimp plug disposed behind the biasing means and having a front surface in contact with the biasing means.

9. A connector system comprising first and second mating connectors, each connector comprising at least:

an outer housing having at least one cam;

an inner housing disposed in said outer housing and having a front and back orientation, said inner housing comprising a plurality of ferrule receiving cavities and a latch, wherein, when said mating connectors are in a mated condition, the latch of the second connector is actuated by the cam of the first connector when said outer housing of the first connector is moved backward relative to said inner housing of said first connector to effect the release of said mating connector; and a plurality of ferrules disposed in said ferrule receiving cavities, each ferrule comprising a plurality of fibers therein.

10. The connector of claim 9, wherein the inner housings of said first and second connectors are hermaphroditic.

11. The connector of claim 10, wherein the outer housings of said first and second connectors are hermaphroditic.

12. The connector of claim 10, wherein said inner housing has opposing sides, said latch disposed on one side and a shoulder adapted for engaging with a mating latch of said mating connector disposed on the other side.

13. The connector of claim 9, wherein said inner housing of the first connector comprises a shoulder adapted for engaging the latch of the second connector.

* * * * *